W. BIRCH.
Machine for Opening, Smoothing, Spreading and Guiding Fabrics.

No. 198,787. Patented Jan. 1, 1878.

Witnesses.
Edgar Tate
J. H. Scarborough

Inventor.
W. Birch
per
Attorneys.

N. PETERS, PHOTO-LITHOGRAPHER, WASHINGTON, D. C.

UNITED STATES PATENT OFFICE.

WILLIAM BIRCH, OF SALFORD, ENGLAND.

IMPROVEMENT IN MACHINES FOR OPENING, SMOOTHING, SPREADING, AND GUIDING FABRICS.

Specification forming part of Letters Patent No. 198,787, dated January 1, 1878; application filed October 6, 1877.

*To all whom it may concern:*

Figure 1:
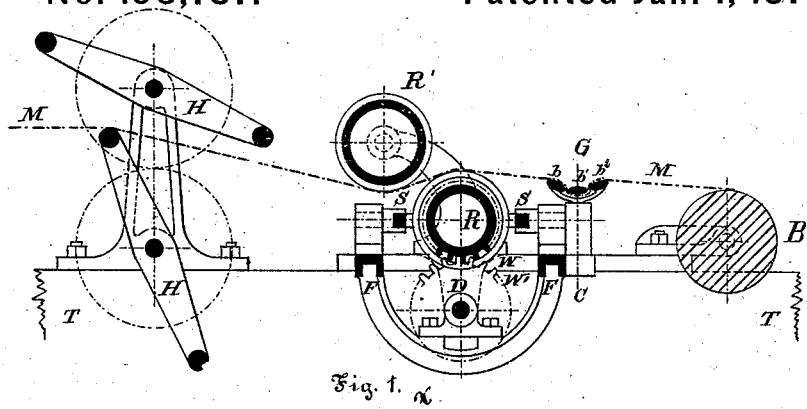
Figure 2:
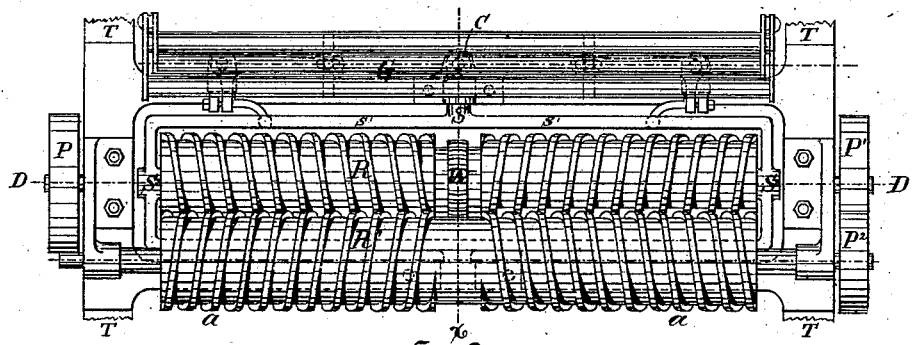
Figure 3:
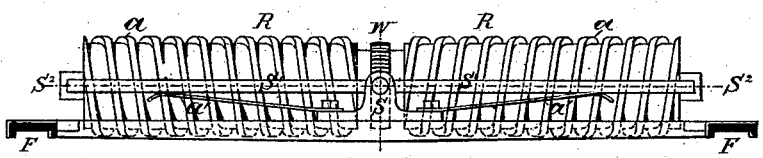
Figure 4:
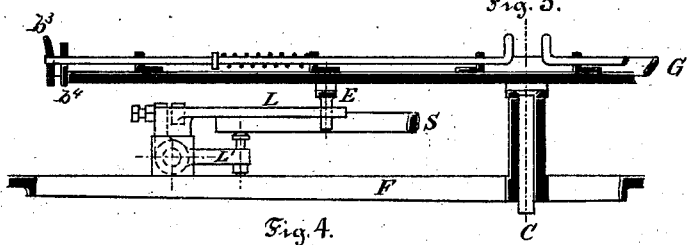
Figure 5:
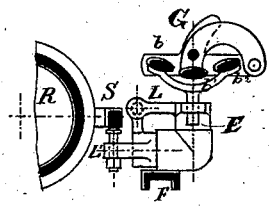
Figure 6:
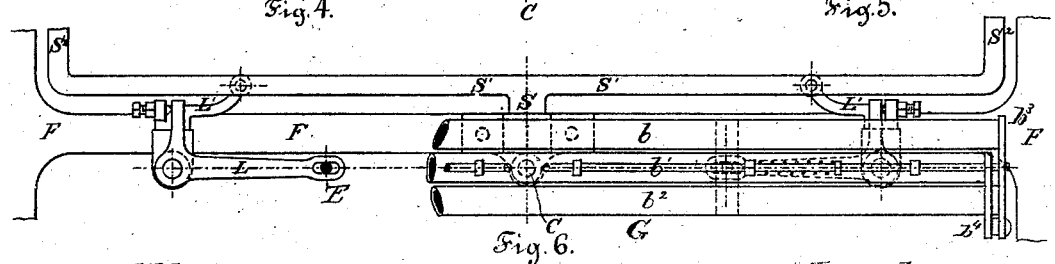

Be it known that I, WILLIAM BIRCH, of Salford, in the county of Lancaster, England, have invented a new and Improved Machine for Opening, Smoothing, Spreading, and Guiding Fabrics, of which the following is a specification:

Figure 1 is a cross-section of the machine, taken on line $x\ x$ in Fig. 2. Fig. 2 is a plan view. Fig. 3 is a detail view of the swivel-roller, in elevation. Figs. 4, 5, and 6 show the governor and its connections, with the swivel-roller.

Similar letters of reference indicate corresponding parts.

The object of the invention is to furnish a simple and compact machine for the use of bleachers, dyers, calico-printers, and others, for opening, smoothing, spreading, and guiding fabrics.

The invention will first be described in connection with drawings, and then pointed out in the claims.

Referring to the drawings, T T are timbers which support the frame F, to which the principal parts of the machine are attached. R and R′ are rollers, that are provided with spiral ribs or screw-threads $a$, which extend from the center of the rollers each way toward their ends. These ribs are right-handed on one end of the rollers, and left-handed on the other end, and the ribs on the two rollers are oppositely arranged in respect to each other. The shaft of the roll R′ is journaled in fixed standards attached to the frame F, and the roller R is journaled in a frame, $S^1\ S^2$, having pivots S, which are supported in suitable boxes attached to the frame F. Springs $a'$ are attached to the frame F, and bear up the ends of the frame $S^1\ S^2$.

On the center of the roller R a spur-wheel, W, is placed, which meshes with a spur-wheel, W′, on the shaft D. The governor G is supported in front of the rolls R R′, upon the pivot C. The governor consists of three parallel bars, $b\ b^1\ b^2$, two of which, $b\ b^2$, are secured to the pivot C, and are provided with end pieces $b^3$, to which are hinged arms $b^4$, that support the bar $b^1$.

The bar $b^1$ is provided with spring-bolts, which project into holes in the end pieces $b^3$, and hold it below the upper surface of the bars $b\ b^2$. Pins E are attached to the bars $b\ b^2$, one on each side of the pivot C, and project downward into slots in the longer arm of the right-angled levers L. These levers are pivoted to the frame F, and swing in a horizontal plane, and engage levers L′, which are also pivoted to the frame F, and move in a vertical plane.

The longer arm of the levers L′ is provided with an adjusting-screw, that bears against the under surface of the frame $S^1\ S^2$.

A roller, B, is journaled in the front portion of the frame, for receiving the cloth after it has been acted upon by the spirally-ribbed rollers and beaters H, which are journaled in the rear portion of the machine.

The cloth, which is indicated by the broken line M, is first taken through the beaters, and and thence between the rollers R′ R, touching first the under surface of the fixed roller R′, which projects a small distance below a horizontal line drawn over the top of the roller R, the latter being placed slightly in advance of the former, so that the fabric may be drawn under one and over the other without being clamped between them. The fabric passes from the under surface of the roller R′, over the upper surface of the roller R, to the governor G, between the bars of which it passes to the roller B.

If the fabric, as it is drawn through the machine by the roller B, passes out of its central course to one side, then the friction on the governor becomes unequally distributed about its center, and the side of the governor to which the fabric has passed is pulled forward toward the roller B. This motion of the governor is communicated, by the pins E and levers L L′, to the swiveled roller R. The distance between the ribbed surfaces of the two rollers is thereby increased on the side to which the fabric has passed, and decreased on the opposite side. The action of the ribs $a$ is thus rendered more effective upon one side than the other, and the fabric is brought back to its central course.

Having thus described my invention, I claim as new and desire to secure by Letters Patent—

1. In a smoothing-machine, the combination, with a governor constructed as described, of the spirally-ribbed or screw-threaded rollers R R' and connecting mechanism, for the purpose specified.

2. In a smoothing-machine, the supporting-frame of roll R, combined with a frame, $S^1 S^2$, pivoted at S and sustained by springs $a' a'$, substantially as and for the purpose specified.

WILLIAM BIRCH.

Witnesses:
 A. HILDEBRANDT,
  *Of 55 Cross street, Manchester.*
 E. BUTLER RAWLEY,
  *Notary Public, Manchester.*